Figure 1:
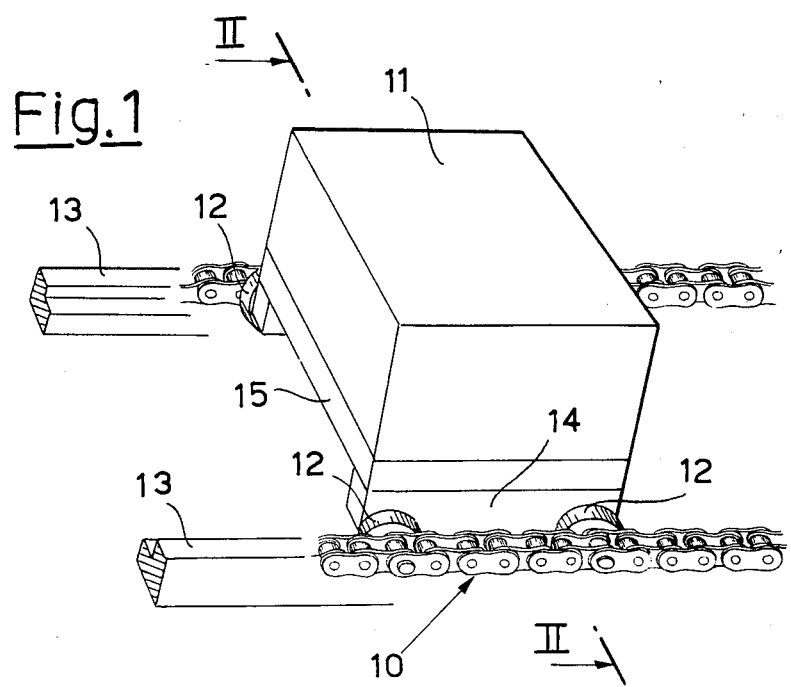

United States Patent [19]
Cattani

[11] Patent Number: 4,562,919
[45] Date of Patent: Jan. 7, 1986

[54] DEVICE FOR POSITIONING A MOBILE MEMBER RELATIVE TO A FIXED MEMBER

[75] Inventor: Alberto Cattani, Modena, Italy

[73] Assignee: Comau S.p.A., Grugliasco, Italy

[21] Appl. No.: 552,064

[22] Filed: Nov. 15, 1983

[30] Foreign Application Priority Data

Nov. 22, 1982 [IT] Italy .................. 53972/82[U]

[51] Int. Cl.[4] .......................................... B65G 25/00
[52] U.S. Cl. ............................. 198/750; 198/345; 414/749; 29/568
[58] Field of Search ............ 82/36 R, 36 A, 35, 36 B, 82/36.1; 269/32, 237, 238; 74/104, 105, 294; 414/917, 739, 744 A, 753, 749; 294/104; 29/568, 26 R, 26 A; 198/345, 750; 211/1.5

[56] References Cited

U.S. PATENT DOCUMENTS

| | | | |
|---|---|---|---|
| 3,482,831 | 12/1969 | Blatt | 269/32 |
| 3,567,208 | 3/1971 | Blatt | 269/32 |
| 3,599,532 | 8/1971 | Matsui | 82/34 A |
| 3,762,036 | 10/1973 | Goebel et al. | 29/568 |
| 4,216,572 | 8/1980 | Matsushita et al. | 29/568 |
| 4,229,866 | 10/1980 | Berthier | 29/26 A |
| 4,312,110 | 1/1982 | Averyanov et al. | 29/568 |
| 4,354,306 | 10/1982 | Ida et al. | 29/568 |
| 4,484,775 | 11/1984 | Norkus | 294/104 X |

FOREIGN PATENT DOCUMENTS

1182892  3/1970  United Kingdom .................. 269/32

Primary Examiner—Joseph J. Rolla
Assistant Examiner—Nils E. Pedersen
Attorney, Agent, or Firm—Young & Thompson

[57] ABSTRACT

A device for positioning the tool head support plate of a machine tool crib in the required head change position, comprises a tool head support plate carried by a crib chain having rollers slidable along fixed guides. A swinging clamp contacts the plate and locks it along the direction of movement of the chain. A pull rod engages with a head on a pull stem on the plate and exerts a pulling action thereon to pull the rollers against the guides. A fluid pressure cylinder actuates a linkage that effects both of these movements.

4 Claims, 4 Drawing Figures

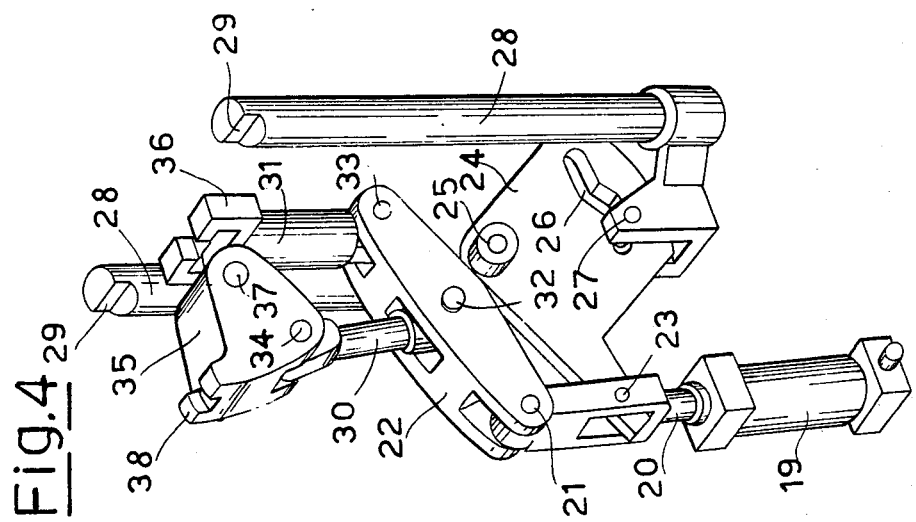
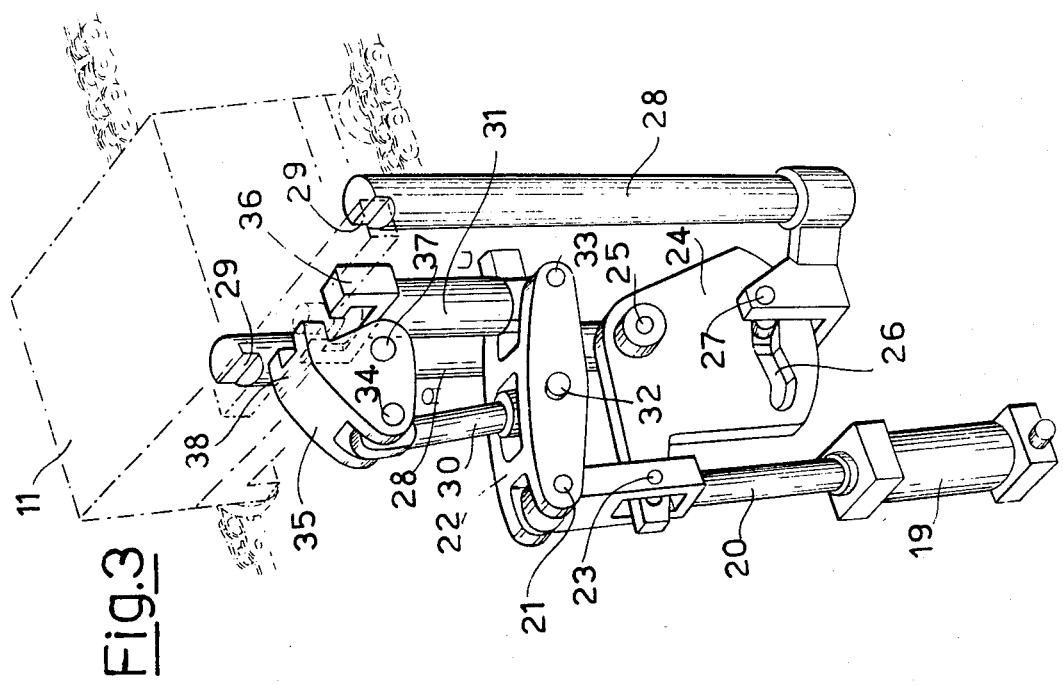

DEVICE FOR POSITIONING A MOBILE MEMBER RELATIVE TO A FIXED MEMBER

DESCRIPTION

The invention relates to a device for positioning a mobile member relative to a fixed member, for example a device for positioning the tool head support plate of a machine tool crib in the head change position.

In this respect, a particular but non-limiting application of the invention is for machine tools known as machining centres. In these machines, large tool heads are sometimes used, each removably mounted on plates carried by chains. The tools of each head can either be single tools (one per head) for milling, reaming or other operations, or multiple tools for drilling, tapping or other operations. In the machining of a work piece, it is therefore necessary to withdraw the required tool head at the correct moment from the tool crib formed from the various tool heads mounted on chains, and to transfer it to its working position.

On termination of the machining operation by one or more of its tools, the head is returned to the tool crib, from which the next required head is withdrawn, carrying other tools for further machining operations.

Each head is commonly mounted on guides on a plate which is rigid with the crib chains, and when the plate laterally reaches a position corresponding with the working zone, suitable pusher means transfer the head onto a corresponding support which supports the head during the machining carried out by its tools.

On termination of the machining operation or operations, the same pusher means re-engage the head, and again transfer it onto the plate which has remained in a waiting position, after which the chain continues its rotation, under command or programming, in order to move a new head into a lateral position corresponding with the working zone, to which the new head is then transferred.

The operations involving the transfer of the heads to and from their working zone must be carried out with maximum precision and rapidity. In this respect, if precision is not guaranteed, the head can be hindered in its transfer from the plate to the support and vice versa, these latter being in exact mutually corresponding positions when the chain stops in order to present the head required for the programmed machining. The head plate must therefore be correctly locked and located so as to enable the head to traverse in both directions without the danger of hindrance.

This is obviously advantageous not only in terms of correct moving of the head, but also in terms of idle times which during a head change must be as short as possible.

Unidirectional positioning and locking systems are currently used for this purpose, they being complicated and not solving the aforesaid problems. In this respect, these systems for example do not allow take-up of the slack due to the wear of the fixed means (plate) and mobile means (heads).

The object of the invention is to propose a system for locking the head support plate in the exact position in which the transfer of the head to the fixed member, i.e. the driving head, must take place. According to the invention, the positioning device is in the form of a member which hooks onto a stem on the plate, and by the action of a cylinder exerts on it a pull which locks it against fixed abutments of the crib, to ensure precision and repeatability of the positioning by locking said system and taking up any slack. This results in considerable simplicity of construction and uniqueness of the system in that it uses a single actuator.

These and further objects which will be more apparent hereinafter are attained according to the invention by a device for positioning a mobile member relative to a fixed member, such as the support for the plates which support the tool heads of a machine tool crib, in the head change position in which a head support plate is carried by a crib chain provided with rollers slidable along fixed guides, characterised by comprising first means for contacting the plate and for locking it along the head transfer axis, and second means for anchoring the plate against fixed crib positions; said first means comprising members for contacting plate abutments and for locking these latter against said members; said second means comprising members for pulling plate abutments against said fixed positions.

Figure 2:
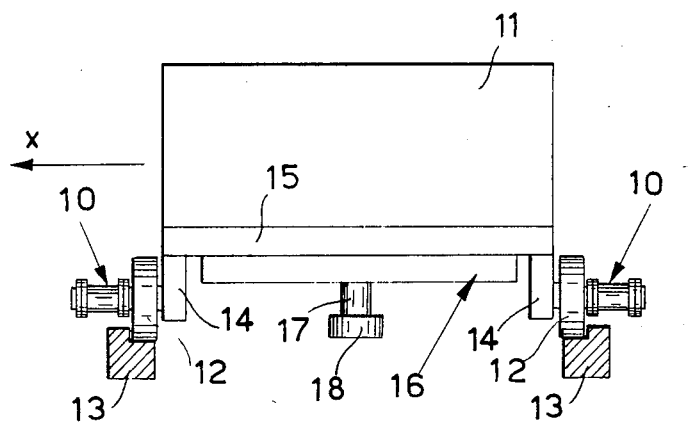

The device according to the invention is described hereinafter with reference to the accompanying drawings in which:

FIG. 1 is a perspective view of a tool head in a crib
FIG. 2 is a section on the line II—II of FIG. 1
FIGS. 3 and 4 show the positioning device according to the invention in its closed and open position respectively.

The drawings show only a portion of the crib chain 10 on which a tool head 11 is mounted. Both the chain 10 and head 11 are in fact of conventional type, known to every expert in the art.

Only this chain portion 10 will be considered, which portion is situated at the point at which the head change is to take place. The term "head change" signifies the condition in which the head 11 is to be transferred onto the drive head of the machine in order to machine work pieces by means of the tools carried by the head 11, these not being shown for simplicity.

The chain 10 carries rollers 12 designed to slide along fixed guides 13 which stabilise its advancing movement. On the pin of the rollers 12 there is also mounted the bracket 14 of the plate 15 on which the head 11 is mounted slidably along the axis x. The head 11 can be connected to the plate by means of dovetail guides, which are not shown as they are of known type.

According to the invention, the plate 15 is provided with a straight bar 16 and a pull stem 17 with a head 18, for the purpose described hereinafter.

FIGS. 3 and 4 show the positioning device according to the invention, which is mounted on the machine within the chain 10, in a position corresponding to that portion shown in FIGS. 1 and 2, i.e. at the point at which the head 11 is to be transferred from the plate 15 to the drive head.

This device comprises a fixed cylinder 19, of which the rod 20 is pivoted at 21 to a lever 22 and carries a plate 24 pivoted at 23. The plate 24 is pivoted on a fixed pin 25 and comprises a slot 26 in which the pin 27 interconnecting two parallel rods 28 slides, these being chamfered at their end 29. To the lever 22 there are also pivoted at 32 and 33 two pull rods 30 and 31, of which the first carries a clamp 35 pivoted at 34, while the second 31 has its end configured as a fork 36 with its arms turned inwards. The clamp 35 is of substantially triangular section with one vertex pivoted at 34 to the pull rod 30, another vertex pivoted at 37 to a fixed point, and the third vertex extending in the form of teeth 38. The operation of the device is as follows:

As a result of suitable programming, the tool head 11 required for carrying out one or more machining operations on a work piece is moved to its point of transfer from the crib to the machine drive head by circulating the chain 10 which carries it.

During the chain movement, the positioning device is in its "open" state of FIG. 4, i.e. in which the rod 20 is retracted, with the result that the clamp 35 is in a rotated position in which the teeth 38 are raised, the pull rod 31 is in an advanced position, and the rods 28 are slightly retracted. In this state it is possible for the chain 10 to move until the head 11 is positioned in its required change position, i.e. for transfer from the crib to the drive head. At this point, the rod 30 is extended in order to cause the device to assume its "closed" positon of FIG. 3.

During this, the following operations take place in the stated sequence: the straight bar 16 of the plate 15 makes contact with the chamfered portions 29 of the rods 28; the clamp 35 swings clockwise as seen in the drawings in order to force the straight bar 16 against the chamfered portions 29, so horizontally positioning the plate 15 carrying the head 11; the fork 36 of the arm 31 exerts a pulling action on the pull stem 17, so taking up the slack of the rollers 12 by forcing them aginst their guides 13.

At this point the plate 15 is in its correct plane, aligned with the drive head guides so that the head 11 can be rapidly and reliably transferred from the crib to the drive head.

After the machining operation has been carried out and the head 11 again transferred onto the plate 15, the device is "opened" as shown in FIG. 4, and a new head 11 is then arranged for positioning as heretofore described.

I claim:

1. A device for positioning a tool head support plate of a machine tool crib in a head change position, in which a head support plate is carried along a path by a crib chain provided with rollers slidable along fixed guides, comprising first means for contacting the tool head support plate and for locking it along said path, and second means for anchoring the plate in fixed positions; said first means comprising members for contacting abutments on said plate and for locking said abutments against said members; said second means comprising means for pulling said rollers against said guides.

2. A device as claimed in claim 1, in which said second means are constituted by a pull rod which engages with a head on a pull stem on said plate and exerts a pulling action thereon.

3. A device as claimed in claim 1, in which said first means comprise two parallel arms having chamfered portions on which a said abutment is made to rest, after which a clamp presses against the opposite side of said abutment to cause locking.

4. A device as claimed in claim 3, in which the first and second means are interconnected by linkages connected to a fluid pressure cylinder which, when actuated, effects, in succession, the longitudinal locking of the plate by swinging the clamp, and the pulling of the rollers against said guides by exerting a pulling action on a pull stem on the plate.

* * * * *